Dec. 5, 1944.   E. STUBBS   2,364,565
APPARATUS FOR LOCALLY HARDENING GEARS, SHAFTS, ETC
Filed Nov. 10, 1939   4 Sheets-Sheet 4
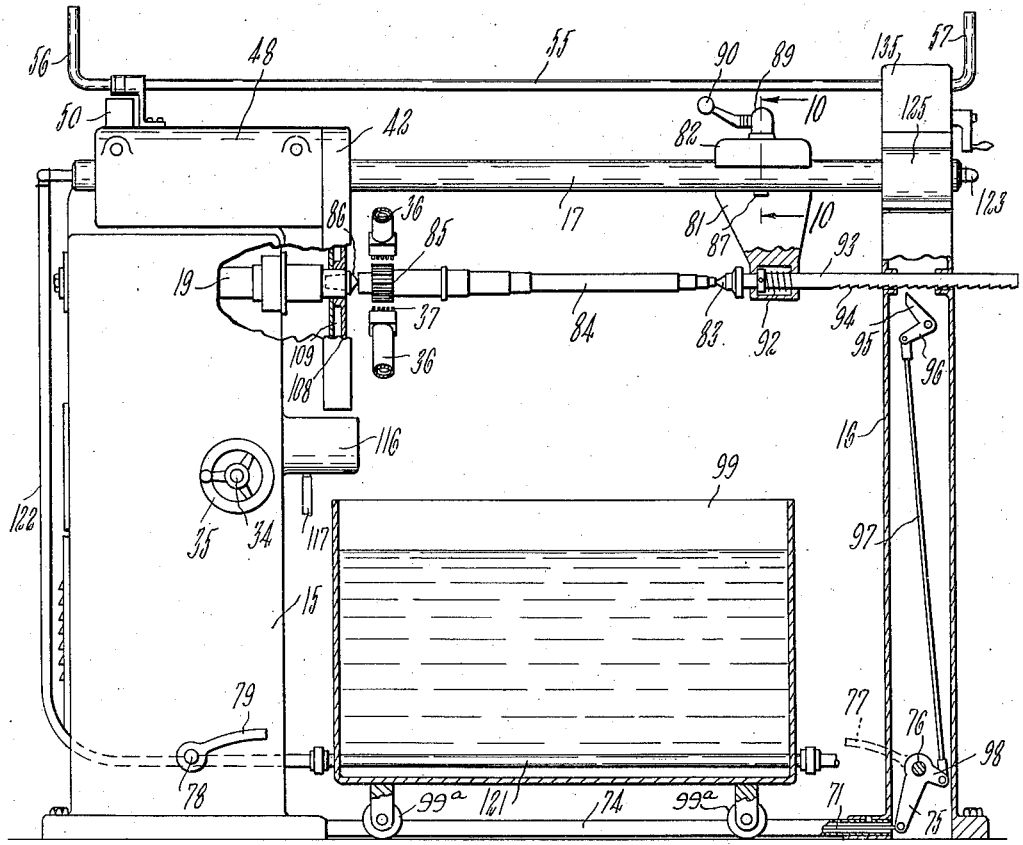
Fig. 9.
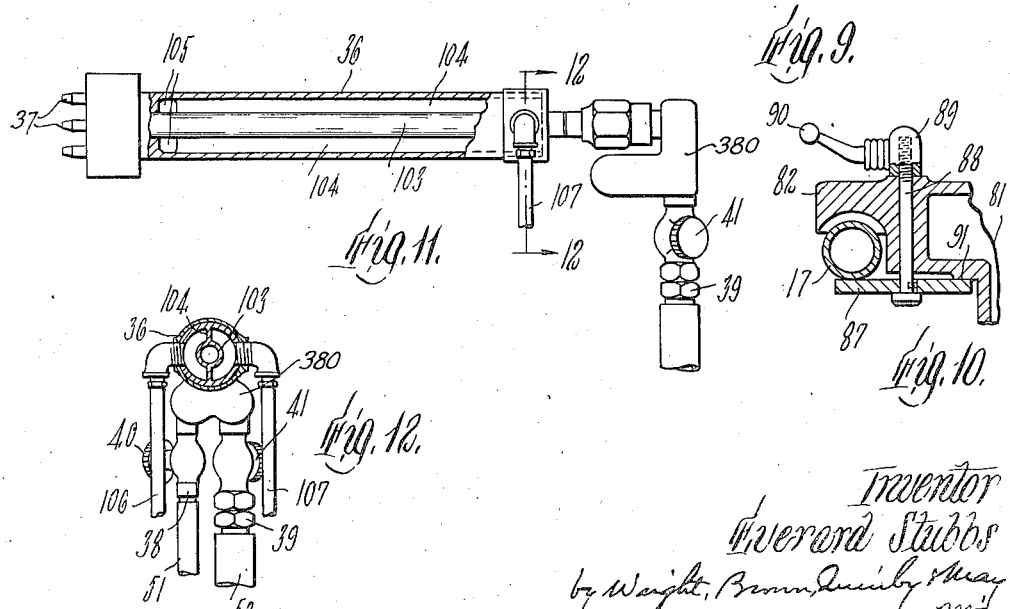
Fig. 11.
Fig. 10.
Fig. 12.
Inventor
Everard Stubbs
by Wright, Brown, Quinby & May
Attys.

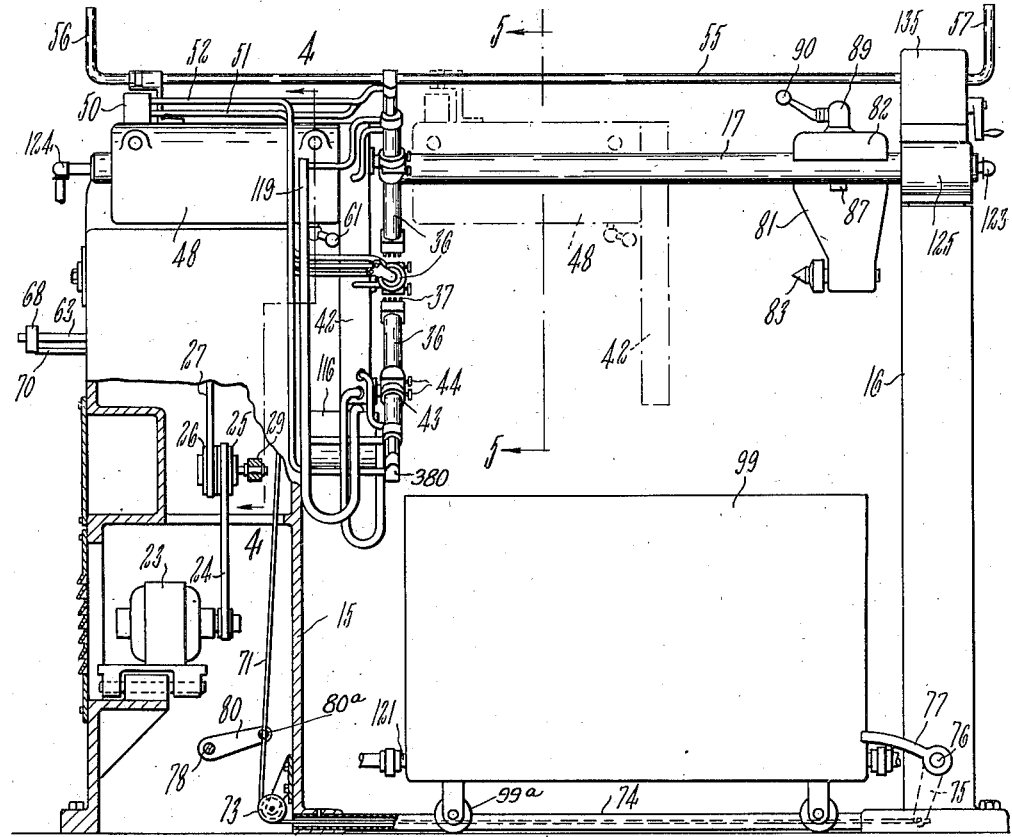
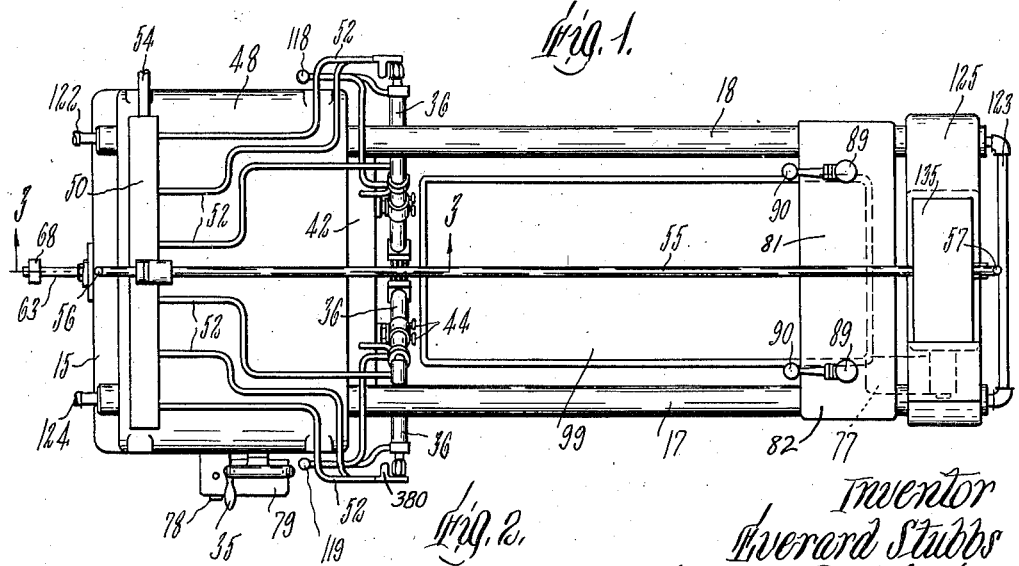

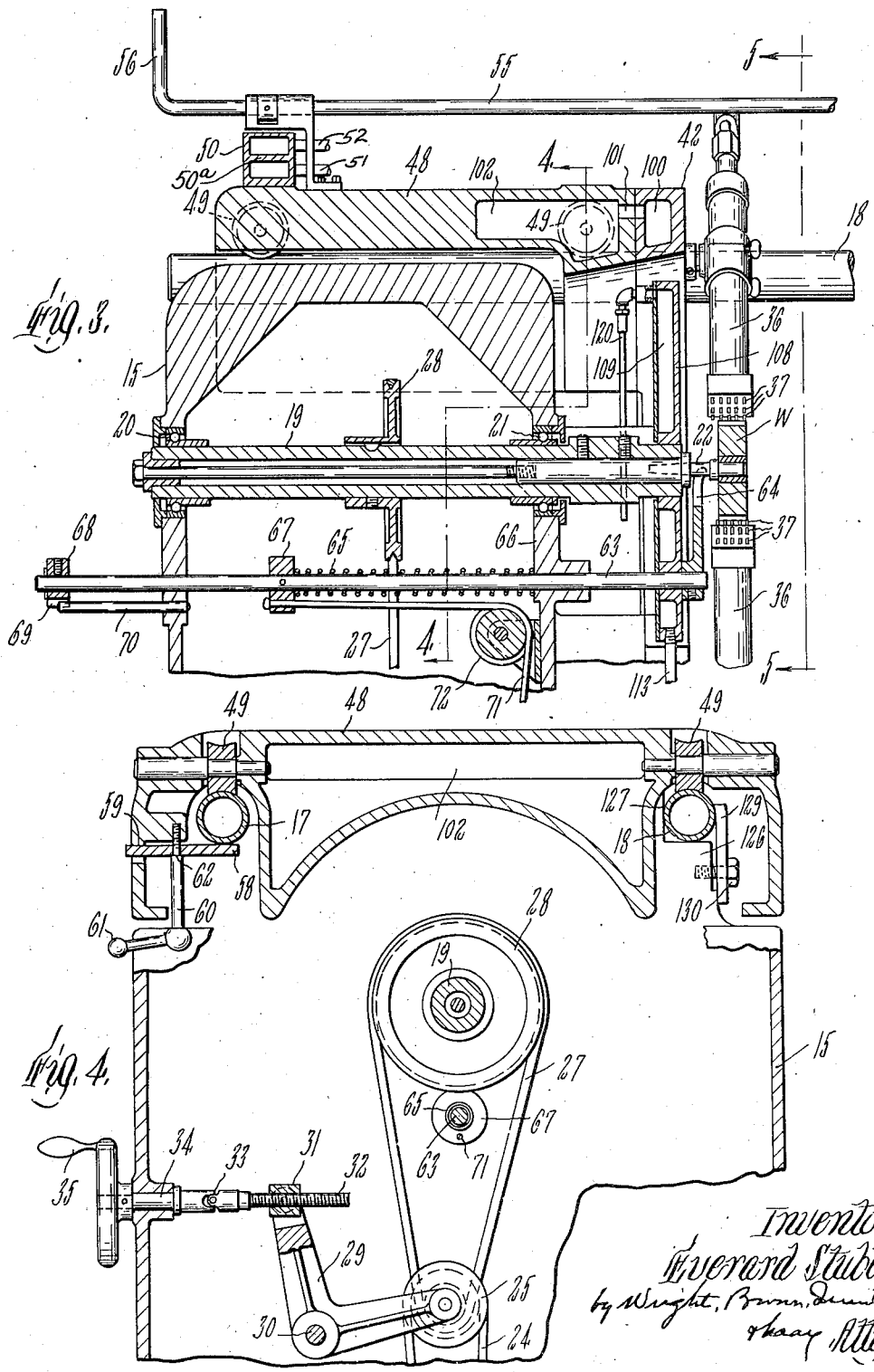

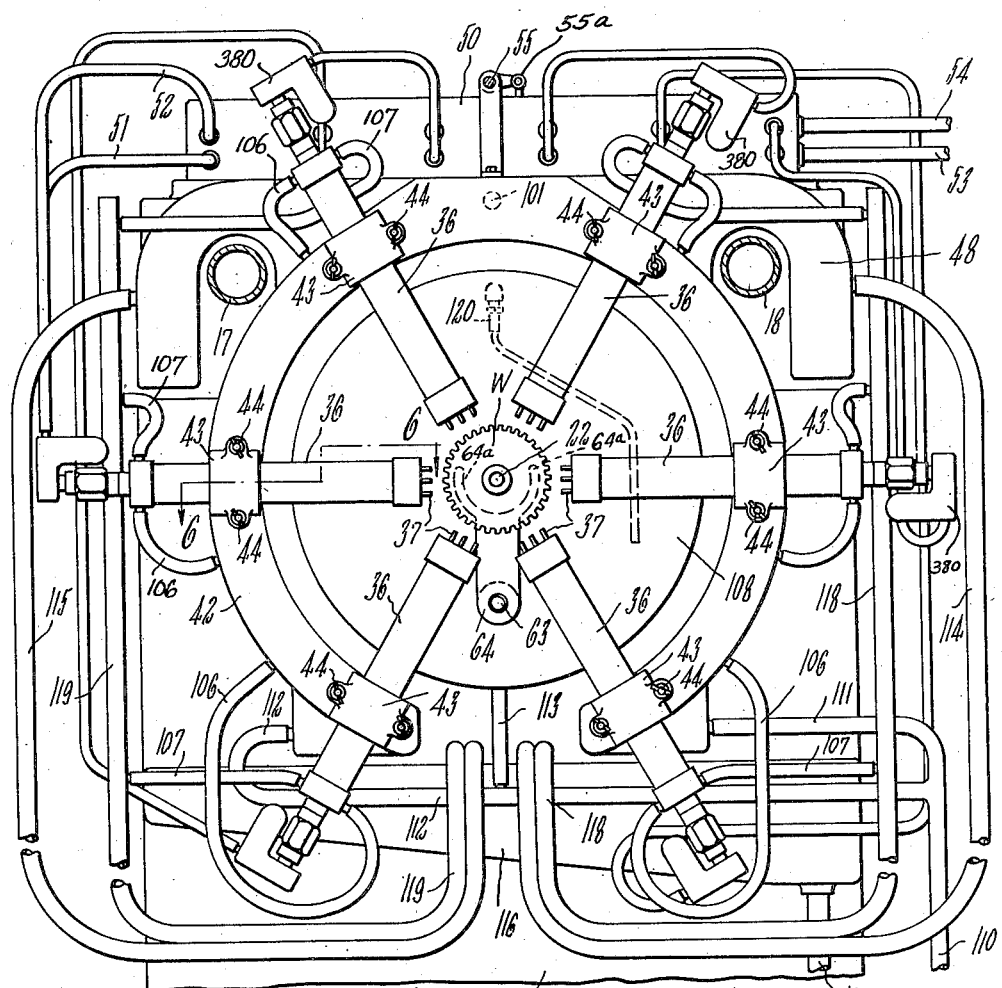

Patented Dec. 5, 1944

2,364,565

UNITED STATES PATENT OFFICE 2,364,565

APPARATUS FOR LOCALLY HARDENING GEARS, SHAFTS, ETC.

Everard Stubbs, Springfield, Vt., assignor to The Fellows Gear Shaper Company, Springfield, Vt., a corporation of Vermont Application November 10, 1939, Serial No. 303,814

7 Claims. (Cl. 266—4)

The present invention is concerned with an improved machine for heat treating metal articles by applying intense heat to such articles externally, rotating them at the same time to distribute and equalize the heating effect, and quenching them in a cooling fluid; in order to harden the superficial parts of the objects without substantially affecting the core or central part. The articles referred to comprise single gears, cluster gears, shafts carrying one or more gears, shafts without gears, and indeed any article adapted to be mounted on a spindle or between centers and to be heat treated locally.

The invention makes use of principles already known for heat treating articles of the character indicated, and has for its object to provide an improved machine having useful features and capabilities not known or realized heretofore. Among its features of utility are: (1) provisions for readily adjusting the heating means to articles of different dimensions and contours; (2) the combination of a supporting and driving spindle with a tail stock easily adjustable to support work pieces of different lengths by itself alone or with the aid of auxiliary supporting means; (3) a supporting structure constructed to provide space beneath the location of the work for a quenching tank or for a chute leading to a tank at one side of the supporting structure, with provisions for locating such chute beneath any location of the work; (4) means for releasing or ejecting the work quickly after attainment of the desired temperature, including provisions by which the operator may actuate such means while at different stations; and (5) means for cooling the parts of the machine adjacent to the zone of heat application and including provisions whereby the heat generating means themselves are cooled so as to permit placement of new work pieces in the machine without danger of harm to the operator, and to permit adjustment of the heating means immediately after heat generation is suspended. These features provide a quick and certain means enabling a large variety of different pieces to be handled and treated with a minimum loss of time for changing the setup of the machine to accommodate different pieces.

One embodiment of the invention is shown in the accompanying drawings and described in the following specification, for illustration of the principles of the invention and the preferred mode of carrying them into effect, but without intent to limit the protection which I claim.

In these drawings,

Fig. 1 is a side elevation, partly broken away and shown in section, of the machine referred to;

Fig. 2 is a plan view of the machine;

Fig. 3 is a longitudinal section on a larger scale of the upper part of the column or head stock of the machine, taken on line 3—3 of Fig. 2;

Fig. 4 is a cross section of the same parts taken on line 4—4 of Figs. 1 and 3;

Fig. 5 is a face view or elevation of the head stock and heating equipment as seen from the line 5—5, Fig. 1, looking in the direction of the arrows;

Figs. 6, 7 and 8 show one of the elements of the heating equipment with details of means for mounting it adjustably to accommodate different types of work;

Fig. 9 is a side elevation and partial section of the machine from the viewpoint of Fig. 1 showing its setup for mounting an elongated work piece between centers;

Fig. 10 is a detail sectional view taken on line 10—10 of Fig. 9 showing the clamping means for the adjustable tail stock;

Fig. 11 is a detail sectional elevation of one of the heating units showing the means for cooling the same;

Fig. 12 is a cross section on line 12—12 of Fig. 11.

Like reference characters designate the same parts wherever they occur in all the figures.

The frame of the machine comprises a box column or upright 15, a post or upright 16 spaced apart from the column, and two horizontal parallel connecting supporting and guiding bars 17 and 18 extending between and secured to the upper ends of the column and post. These uprights may be mounted on a base plate, or separately secured to a floor as here shown. The upper part of the column constitutes a head stock in which a spindle or shaft 19 is supported by bearings 20 and 21. This spindle carries an arbor 22 projecting from its end toward the post 16, adapted to carry a work piece, such as the gear W shown in Figs. 3 and 5. Rotation is imparted to the shaft from an electric motor 23, mounted in the column, through a variable speed reducing drive consisting of a V belt 24 driven by a pulley on the motor shaft, connected intermediate pulleys 25, 26, a V belt 27 and a pulley 28 on the shaft, substantially as shown in Figs. 1, 3 and 4. The pulleys 25 and 26 (or an equivalent two-step pulley) are carried by one arm of a bell crank lever 29 mounted on a fixed pivot 30 in the column. The other arm of the bell crank lever carries a pivoted nut 31 fitted to a screw 32 which is connected through a universal joint 33 with a shaft 34 carrying a hand crank 35. By turning the crank, one or the other of the belts may be tightened and the other loosened, thereby permitting a regulated slip of one or the other belt and adjusting the speed of rotation of the shaft 19 to the correct speed required for the piece undergoing heat treatment. Any speed from very slow to the maximum established by the pulley ratios may be given to the shaft by this means.

The heating equipment used here consists of torches 36 each having a straight shank for adjustment, cooling means, and a bank of burners or jet nozzles 37, disposed at one end so as to direct flames away from that end. A mixing chamber 38C at the other end of the shank is provided with gas inlets 38 and 39 (Fig. 12) controlled by valves 40 and 41. These torches are adapted to burn a mixture of oxygen and acetylene to produce flames having a temperature in the order of 6000° F. Each may be provided with any number of jet nozzles suitable for generating a desired total quantity of heat in an area of any desirable or practicable extent.

The torches, of which there may be any number permitted by the available space, having regard to their dimensions, are mounted around the projected axis of the shaft 19 with their emission ends directed inward and preferably spaced as nearly equiangularly about the axis as is conveniently feasible. However, equality of angular spacing is not a material factor in view of the distribution of heating effect which is caused by rotation of the work. A yoke or frame 42 embracing the shaft axis, and preferably having the form and arrangement shown in Fig. 5, supports the torches. The means for connecting the torches to the frame consists of two-part collars 43 (shown in detail in Fig. 6) one for each torch, of which the parts are clamped on the torch by screws 44. One member of the collar carries a pivot 45 fitted to a bushing 46 mounted in the yoke 42 and having a set screw 47 by which the pivot 45 may be secured against rotation or displacement. The torches have straight shanks of uniform transverse shape and dimensions, and may be moved in or out to any extent permitted by their length and the radius of the yoke to accommodate work pieces of larger or smaller diameters.

The yoke 42 is secured at its upper side to a carriage or saddle 48 which is supported by trundle rolls 49 on the track bars 17 and 18. The saddle is shaped so that it may pass over the upper end of column 15, as shown by Figs. 3, 4 and 5, and is movable along the track bars as far as the post 16, whereby to place the flame equipment at any point between the column and the post. A valve chamber 50 is mounted on the saddle and is connected by flexible pipes 51 and 52 with the inlet connections 38 and 39 of the torches. Each torch is thus connected by flexible conduits with the valve chamber. Where a mixture of gases, such as acetylene and oxygen is burned by the torches (as is the case here) the chamber is divided by a partition into separate compartments—one for each gas. The gases from the respective chambers are separately conducted to the mixing chambers of the torches. Gases from any available sources of supply are conducted by pipes 53 and 54 to the respective compartments of the valve chamber, and in the latter are valve means of any suitable character adapted to open or close the supply of gases to all of the torches simultaneously.

An operating rod 55 extends through bearings on the carriage 48 and post 16 and is provided with handles 56 and 57 at opposite ends, whereby an operator standing adjacent to either end of the machine may turn it to open or shut off the gas supply from chamber 50 to the burners. Connections are shown at 55a in Fig. 5 by which the rod, when so turned, so controls the supply of gas.

The carriage is made fast in any of its adjusted positions by means of clamps 58, one of which is shown in Fig. 4, underlying the track bars. These clamps have a fulcrum bearing at 59 on the carriage structure, and they are supported, set up and released by a bolt 60 which carries an operating handle 61 and is screwed into the carriage structure and has a shoulder 62 bearing against the under side of the clamp.

The work when heated to the desired degree is released, and may be ejected from the driving shaft by an ejector 64 carried by an ejector rod 63 supported slidingly in the column beneath and parallel to the shaft 19. The ejector 64 is a forked arm rising from rod 63 close to the work piece at the rear side thereof and having arms 64a which embrace the axis of the spindle 19. The ejector rod is normally retracted by a spring 65 reacting between the column wall 66 and a collar 67 on the rod, and it is prevented from rotating by a collar 68 secured to its protruding end and having a groove 69 fitting a fixed guide rod 70. A cord 71 is secured to the collar 67 and passes around a guide pulley 72 beside the ejector rod 63, thence downward and around a guide pulley 73 in the bottom of the column, and through a conduit 74 to connection with a lever arm 75 in the post 16. Arm 75 is secured to a shaft 76 passing through the front side wall of the post, and on the outer end of which is fixed a pedal 77. A shaft 78 is mounted rotatably in the front wall of column 15, and carries on its outer end a pedal 79 and also carries, within the post, an arm 80 which is made fast to the cord by a clamp 80a. Either pedal may be depressed by the operator's foot; and they are so arranged that depression of either will move the cord endwise in the direction to advance the ejector and displace the work piece from the spindle. This combination of pedals and cord with the ejector has the utility of enabling the operator, when standing near either end of the frame, to eject the work.

A tail stock 81 is supported by the bars 17 and 18, having lateral arms 82, which rest on the bars, and a central part which hangs between the bars. The depending part carries a center 83 in line with the axis of shaft 19, whereby to support elongated work pieces such as a shaft 84 having a gear 85 cut in a portion of its substance, as shown in Fig. 9. When a work piece of this character is operated on, a live center 86 may be set into the drive spindle in place of the arbor 22.

A great variety of elongated work pieces may be thus mounted; including arbors carrying single gears or cluster gears, shafts on which gears are mounted or in which gears are formed in any part of their length, or shafts, trunnions, etc. which are required to be locally hardened in a portion only of their length. The tail stock may be set in any location along the supporting bars to accommodate pieces of any length within the capacity of the machine, and may be secured by clamping means similar to those provided with the carriage. One of such clamping means is shown in detail in Fig. 10 and consists of a bar 87 underlying the supporting bar and supported by the head of a bolt 88 which passes vertically through the contiguous arm portion of the tail stock and is fitted with a clamp nut 89 on its upper end, having an operating handle 90. The clamp bar has a fulcrum bearing at 91 against a shoulder at the under side of the tail stock arm.

The adjustable tail stock and adjustable carriage 48 cooperate to enable pieces of various lengths to be heat treated in any portion of their length. The tail stock may be set anywhere between the post 16 and the most retracted position of the torch carrier; while the carriage may be moved to place the torches in any location between the column 15 and the tail stock.

The tail stock center 83 is retractable by the pedal 77. I have shown in Fig. 9 one possible means for so retracting it. Here the center is mounted with provision for endwise movement in the line of the drive shaft axis and is advanced by a spring 92. It is connected to a bar 93 which passes through guides in the post 16 and has ratchet teeth 94 on its under side. A pawl 95 is mounted in the post adjacent to the toothed side of bar 23 and is connected by means of a crank arm 96 and connecting rod 97 with an arm 98 secured to the rock shaft 76.

Work pieces when released by advance of the ejector 64, or retraction of center 83, or the joint action of both, may fall into a tank 99 containing a quenching fluid, which may be oil or any other liquid suitable for the purpose. Such a tank or other recipient may be placed directly in the space between the column and post, as shown in these drawings, or elsewhere. Flexibility of placement of the tank, which may be mounted on wheels 99a to give it easy mobility, is afforded by this construction of the framework.

A comprehensive cooling system is provided to keep the parts of the machine adjacent to the flame equipment at moderate temperature and to cool such parts quickly, so as to permit mounting of new work pieces, and also adjustment of the carriage if necessary, immediately after the flames are shut off. The frame or yoke 42 on which the torches are mounted contains an interior chamber 100 (Figs. 3, 6, 7 and 8), which communicates through an opening 101 with a chamber 102 in the adjacent end of the carriage 48. The torches are constructed with an inner tube 103 (Figs. 11 and 12) for conducting the mixture of gases to the burner, and with an outer shell or jacket, between which and the inner tube is an annular chamber, divided by a partition 104 into circulating passages communicating with each other only through openings 105 in the partition at the end next to the burner head. The passage at one side of the partition is connected, at the outer end, by a flexible pipe 106 with the chamber in yoke 42, and the outer end of the other passage is connected by a flexible pipe 107 with a discharge pipe later described.

A face plate 108 (Fig. 3) is supported from the column to surround the outer end of the drive shaft and is formed with an internal chamber 109. Water is circulated through these chambers and passageways. Fig. 5 shows in a diagrammatic way an arrangement of piping for supplying and carrying away the cooling water. A supply pipe 110 has branches 111 and 112 leading to connections with the opposite ends of the chamber 100 in the torch holding frame. A pipe 113 leads from the branch 112 to a connection with the face plate chamber 109. Pipes 114 and 115 lead from the opposite sides of the chamber 102 in the carriage to a receiving chamber 116 constructed on or forming part of the column 15, from the bottom of which a drain pipe 117 leads. The eduction pipes 107 from the cooling spaces of the several torches connect with pipes 118 and 119 at opposite sides of the machine, which likewise pass to the receiving chamber. A drain pipe 120 from the back of the face plate, connecting with the chamber 109 therein, is also arranged to discharge into the chamber 116. Thus it will be seen that water supplied to the pipe 110 is caused to flow continuously through all the water spaces thus far described. The capacity of these spaces and connections is sufficient to carry away heat so rapidly that, immediately after the torch flames have been shut off, the torches may be adjusted and work pieces may be set in place without danger of burning the operator's hands.

It will be understood that the pipes for both gases and water leading to and from the torches are flexible and have sufficient length to permit adjustment of the torches radially throughout the range permitted by their construction; and also that the pipes 114, 115, 118 and 119 are flexible, or include flexible connections, and are long enough to permit adjustment of the carriage throughout the full range permitted. In order to make the drawings more readily legible I have shown these pipes as of less than their actual length and in a conventional arrangement, which is to be taken as illustrative but not limiting as to the scope and utility of the invention.

The liquid in the quenching tank is also cooled to prevent excessive heating by continued succession of hot work pieces. A satisfactory mode of cooling the quenching liquid is to circulate it by a pump from the tank past cooling coils containing circulating cold water; but for simplification of these drawings I have shown the cooling means here as a pipe 121 passing through the tank and through which water is caused to flow. Pipe 121, or the equivalent cooling coils, may be connected in series either with the supply pipe 110 or the waste pipe 117. It may also be connected with the bars 17 and 18, which are tubular, so as to maintain the latter at low temperature. The present drawings show a connection 122 from pipe 121 to the bar 18, an intermediate connection 123 between the two bars and a waste outlet 124 from the bar 17. This, however, is an optional detail and the supporting bars may be connected in series with the circulating system 110—117 first described, or with both that system and the quenching liquid cooler.

The supporting bars 17 and 18 are fitted at one end in passageways through a head 125 mounted on top of the post 16, while their opposite ends are supported on shoulders at the opposite sides of the column 15. One of such shoulders is shown at 126 in Fig. 4. The bar is retained on the shoulder and forced against an adjacent upright surface 127 of the post by a clamp 129 secured by a bolt 130. The other bar is similarly clamped.

Part of my invention comprises means for adjusting the torches to direct flames squarely against the toothed zones of bevel gears. A form of torch adapted to serve with either bevel or spur gears with minimum displacement from a plane perpendicular to the axis of the gear, and without obstructing ejectment of the gear from the spindle, is shown in Figs. 7 and 8. The head 131 of this torch has two sets of burners or jets, namely, the jets 37 corresponding to those previously described and projecting from the head in line with the length of the torch, and burners 132 projecting from one side of the head. The clamp 43a which grasps the torch body is connected with the supporting post 45a by a swivel connection and clamp 133 arranged to permit angular adjustment of the torch to various inclinations with the plane of the holder frame or yoke 42. A valve 134 in the head 131 is operable to direct the gases into either set of burners while excluding them from the other. The swivel adjustment enables the torch to be used with its set of burners 37 directing flames against either a spur gear or a bevel gear of which the apex of the pitch cone is away from the face plate 103, as shown in Fig. 7; and permits setting of the torch so that the burners 132 direct flames against bevel gears of which the pitch cone apex is directed toward the face plate, as shown in Fig. 8. In the latter case, as well as the former, the burners are clear of the work, leaving an unobstructed space for its removal.

Driving torque is transmitted from the drive shaft to the work by friction alone. Thus there is nothing in the nature of a chuck, driving dogs, etc. to obstruct free and instantaneous release of the work when the desired temperature has been attained.

In operation a work piece, if of sufficiently short axial length, is placed on an arbor projecting from the end of the spindle. If the piece is too long to be thus supported, it is held between centers on the spindle and tail stock. The motor is started by closing a switch and the gas is turned on to the torches by turning of either handle 56 or 57. The jets may be ignited by any suitable means of known character. The mixture of gases emitted from the torch burners produces small intensely hot flames which, by a suitable adjustment of the torches, are caused to impinge at their zones of highest temperature on the periphery of the work piece. The quantity of heat so delivered is regulated by closing or opening a suitable number of the burners. Rotation of the work piece at a suitable speed, causes the heating effect to be equally and uniformly distributed throughout the circumference of the piece. The speed of rotation is regulated according to the dimensions and composition of the piece and the distance apart of the torches from one another. Within a short time, which is a matter of seconds rather than minutes, the peripheral zone of the work piece becomes red hot, and when the temperature is high enough, the piece is ejected and allowed to drop into a quenching bath beneath, or may be carried by transfer means to a bath at one side of the machine frame.

The adjustability of the torches provides accommodation for work pieces from the smallest diameter up to those approximating the width between the diametrically opposite torches when at their outer limit of adjustment. In the case of work pieces so small that, either, heat delivered by all the torches simultaneously would be too great, or interference of the burner heads would prevent adjustment of the burners close enough to the piece, any one or more of the torches may be put out of action by closing their valves 40 and 41, and placed at a distance from the center, while a sufficient number of torches are located in the proper propinquity to the work and put into action.

The speed of rotation may be regulated by the adjuster crank 35 to any value between limits which, in the particular machine here illustrated, are between about 100 and 800 revolutions per minute, so as to obtain a desired peripheral speed of the work piece, according to its diameter. A box 135 on top of the post 16 contains timing means of known character, by which the duration of heat generation may be controlled in known manner.

What I claim and desire to secure by Letters Patent is:

1. A machine for heat treating metal articles comprising a column, a shaft mounted to rotate in said column and having means for supporting and rotating articles to be heat treated, flame projecting equipment supported by the column in position to direct flames against an article supported by the shaft, a chambered face plate surrounding the axis of the shaft in a location between the flame equipment and the column, and connections for circulation of cooling fluid through the chamber of said face plate.

2. A machine for heat treating metal articles comprising a supporting structure including a column, a spindle for supporting and rotating work pieces mounted rotatably on said column, a carriage supported on the column and being movable back and forth in directions substantially parallel to the axis of said spindle, a torch holding frame secured to said carriage and having depending portions embracing said axis, torches carried by said frame arranged to direct flames on an article supported in operating position by said spindle, said carriage frame and torches having interior communicating passageways for a cooling fluid, and means for causing flow of fluid in series through said passageways.

3. A machine of the character set forth comprising separated supports, track bars extending from one support to the other, a drive shaft rotatably mounted in one of said supports with its axis substantially parallel to the track bars, an ejector adjacent to the drive shaft and mounted with provision for movement to displace work pieces from the shaft, and means operable from points adjacent to either support for actuating said ejector.

4. A machine of the character set forth comprising separated supports, track bars extending from one support to the other, a shaft rotatably mounted in one of said supports with its axis substantially parallel to the track bars, heating means arranged to apply heat to an article engaged with said shaft, a tail stock supported by the track bars and adjustable thereon toward and away from the support in which said shaft is mounted, a center mounted on said tail stock, an ejector mounted beside the shaft, and operating means for both advancing said ejector and retracting said center.

5. A heat treating machine comprising a supporting structure having track elements, a shaft for supporting and rotating articles to be heat treated mounted rotatably on said supporting structure with its axis substantially parallel to said track elements, a carriage supported by said track elements and movable lengthwise thereof, a yoke secured to said carriage embracing the axis of said shaft, torch clamp in swiveled connection with said yoke disposed angularly around the axis of the shaft, and torches having straight shanks of substantial length held by said clamps and being adjustable with respect thereto toward and away from the shaft axis through distances substantially equal to the radius of the inner circumference of said yoke; said torches having burners at their inner ends.

6. A heat treating machine comprising a supporting structure, a shaft rotatably mounted on said structure adapted to support and rotate articles to be treated, a yoke embracing the axis of said shaft, torches having burners at one end arranged to direct flames respectively lengthwise and laterally of the torches, and means for mounting said torches on said yoke in positions at different sides of the shaft axis, said mounting means having provision for angularly adjusting the torches with respect to said yoke so as either to direct flames from the lonigtudinal burners in lines substantially normal to the contiguous side of a cone of which the apex is directed toward one side of the plane in which the yoke is located, or to direct flames from the lateral burners in lines substantially normal to the contiguous side of a cone of which the apex is directed toward the opposite side of said plane.

7. A machine for heat treating metal articles comprising a supporting column, a shaft rotatably mounted on said column having means at one end for supporting a piece to be heat treated, flame equipment arranged to direct flames against a piece so supported, a rod mounted in said column substantially parallel to the shaft and being movable endwise, a forked ejector secured to said rod extending therefrom toward the shaft and having branches embracing the shaft axis in a location adjacent to the rear end of a work piece applied to the shaft, yieldable means normally holding the rod and ejector in retracted position, means actuable by the machine operator for advancing the rod to separate the work piece from the shaft, and flame equipment arranged to direct flames against such work piece.

EVERARD STUBBS.